(12) United States Patent
Bening et al.

(10) Patent No.: US 7,009,000 B2
(45) Date of Patent: Mar. 7, 2006

(54) COUPLED STYRENIC BLOCK COPOLYMERS AND PROCESS FOR PREPARING SAME

(75) Inventors: Robert Bening, Katy, TX (US); Harvey Atwood, Kingwood, TX (US); Marinus Pieter van Dijk, Amsterdam (NL); Adriana Maria Petronella Ros, Amsterdam (NL); Barry Moore, Cypress, TX (US); Carl Willis, Houston, TX (US); Nikolaas Jan van Dijk, Amsterdam (NL)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 10/618,394

(22) Filed: Jul. 11, 2003

(65) Prior Publication Data

US 2004/0054090 A1  Mar. 18, 2004

Related U.S. Application Data

(60) Provisional application No. 60/395,139, filed on Jul. 11, 2002.

(51) Int. Cl.
*C08F 297/02*   (2006.01)
*C08F 297/04*   (2006.01)
*C08L 53/04*    (2006.01)
*C08L 95/00*    (2006.01)

(52) U.S. Cl. .................. 525/98; 525/316; 525/250; 525/366

(58) Field of Classification Search ............... 525/98, 525/316, 250, 366
See application file for complete search history.

(56) References Cited

U.S. PATENT DOCUMENTS

| | | |
|---|---|---|
| 3,631,006 A | 12/1971 | Hawkins |
| 4,429,090 A | 1/1984 | Hall |
| 4,429,091 A | 1/1984 | Hall |
| 4,473,661 A | 9/1984 | Hall |
| 4,476,240 A | 10/1984 | Hall et al. |
| 4,480,075 A | 10/1984 | Willis |
| 4,518,753 A | 5/1985 | Richards et al. |
| 4,520,123 A | 5/1985 | Hall |
| 4,530,984 A | 7/1985 | Hall |
| 4,591,624 A | 5/1986 | Hall |
| 4,889,900 A | 12/1989 | DuBois |
| 5,063,190 A | 11/1991 | Hargis et al. |
| 5,202,499 A | 4/1993 | Hargis et al. |
| 5,216,181 A | 6/1993 | Hargis et al. |
| 5,272,214 A | 12/1993 | Custro et al. |
| 5,331,058 A | 7/1994 | Shepherd et al. |
| 5,376,745 A | 12/1994 | Handlin, Jr. et al. |
| 5,397,851 A | 3/1995 | Knauf et al. |
| 5,412,045 A | 5/1995 | Osman et al. |
| 5,416,168 A | 5/1995 | Willis et al. |
| 5,420,203 A * | 5/1995 | Dillman et al. .............. 525/98 |
| 5,552,493 A | 9/1996 | Spence et al. |
| 5,610,227 A | 3/1997 | Antkowiak et al. |
| 5,665,827 A | 9/1997 | Hall |
| 5,677,399 A | 10/1997 | Hall |
| 5,700,888 A | 12/1997 | Hall |
| 5,936,029 A | 8/1999 | Hall |
| 6,103,846 A | 8/2000 | Willis et al. |
| 6,242,537 B1 | 6/2001 | Bening et al. |
| 6,242,538 B1 | 6/2001 | Bening et al. |
| 6,271,324 B1 | 8/2001 | Jungling et al. |
| 6,391,981 B1 | 5/2002 | Willis et al. |
| 6,455,651 B1 | 9/2002 | Willis et al. |
| 6,462,143 B1 | 10/2002 | Willis et al. |
| 6,492,466 B1 | 12/2002 | Willis et al. |
| 6,492,469 B1 | 12/2002 | Willis et al. |
| 6,506,846 B1 * | 1/2003 | Schade et al. .............. 525/316 |
| 2003/0114592 A1 | 6/2003 | Brockmann et al. |
| 2003/0114611 A1 | 6/2003 | Brockmann et al. |

FOREIGN PATENT DOCUMENTS

| | | |
|---|---|---|
| WO | WO 97/33923 | 9/1997 |
| WO | WO 98/07765 | 2/1998 |
| WO | WO 98/07766 | 2/1998 |

OTHER PUBLICATIONS

"Solid-State NMY of Aromatic Polyamides," by S. A. Curran, C.P. LaClair, and S.M. Aharoni, *Macromolecules 1991*, 24, pp. 5903-5909.

"Towards the Control of the Reactivity in High Temperature Bulk Anionic Polymerization of Styrene, 1," by P. Desbois, M. Fontanille, A. Deffieux, V. Warzelhan, S. Latsch, C. Schade, *Macromol. Chem. Phys 200*, (1999) pp. 621-628.

"Controlled Anionic Polymerization of tert-Butyl Acrylate With Diphenylmethylpotassium in the Presence of Triethylborane," by T. Ishizone, K. Yoshimura, E. Yanase, and S. Nakahama, *Macromolecules 1999*, 32, pp. 955-957.

(Continued)

*Primary Examiner*—James J. Seidleck
*Assistant Examiner*—Olga Asinovsky
(74) *Attorney, Agent, or Firm*—Dean F. Vance; Donna B. Holguin; Michael A. Masse

(57) ABSTRACT

Disclosed is an improvement to a process for preparing coupled styrenic block copolymers wherein adding from about 0.01 to about 1.5 equivalents of a metal alkyl compound per equivalent of living polymer chain ends to the cement, during or after polymerization, improves coupling efficiencies. The resultant radial styrenic block copolymers have reduced amounts of 5+ arm oligomers which can be very desirable is certain applications, such as the modification of bitumen.

21 Claims, No Drawings

OTHER PUBLICATIONS

"Stereospecific Living Polymerization and Copolymerization of Methacrylate and Their Use for Construction of Stereoregular Chain Architecture," by K. Hatada, T. Kitayama, and K. Ute, *Makromol. Chem., Macromol. Symp. 70/71,* (1993) pp. 57-66.

"Identifying the Nature of the Active Species in the Polymerization of Methacrylates: Inhibition of Methyl Methacrylate Hompolymerizations and Reactivity Ratios for . . . ," by D. M. Haddleton, M. C. Crossmam, K. H. Hunt, C. Topping, C. Waterson, and K. G. Suddaby, *Macromolecules 1997,* 30, pp. 3992-3998.

"Mechanism of Anionic Polymerization of (Meth)acrylates in the Presence of Aluminum Alkyls, 6. Polymerization of Primary and Tertiary Acrylates," by B. Schmitt, H. Schlaad, and A. H. E. Muller, *Macromolecules,* vol. 31, No. 6, Mar. 24, 1998, pp. 1705-1709.

* cited by examiner

COUPLED STYRENIC BLOCK COPOLYMERS AND PROCESS FOR PREPARING SAME

CROSS-REFERENCE TO RELATED APPLICATION

The present application claims priority from copending, commonly assigned U.S. provisional patent application Ser. No. 60/395,139, filed Jul. 11, 2002, entitled Coupled Styrenic Block Copolymers and Process for Preparing Same.

BACKGROUND OF THE INVENTION

1. Field of the Invention

The present invention relates to styrenic block copolymers and a process for preparing same. The present invention particularly relates to coupled styrenic block copolymers and a process for preparing same.

2. Background of the Art

The preparation of block copolymers is well known. In a synthetic method an initiator compound is used to start the polymerization of one monomer. The reaction is allowed to proceed until all of the monomer is consumed resulting in a living homopolymer. To this living homopolymer is added a second monomer that is chemically different from the first. The living end of the first polymer serves as the site for continued polymerization, thereby incorporating the second monomer as a distinct block into the linear polymer. The block polymer so grown is living until terminated.

Termination converts the living end of the block copolymer into a non-propagating species, thereby rendering the polymer unreactive toward additional monomers. A polymer so terminated is commonly referred to as a diblock copolymer. Alternately, the living block copolymers can be reacted with multifunctional condensing agents commonly referred to as coupling agents. Coupling of the living ends results in radial polymer having at least two branches, the branches being commonly referred to in the art as "arms".

While the resultant block copolymers can have at least two arms, for certain applications, they preferably have three, four, or even more arms. For example, bitumen, also commonly referred to as asphalt, is a cost-effective thermoplastic material used in a wide variety of applications. However, especially in the more sophisticated applications, the performance properties of conventional bitumen have the disadvantage of being very sensitive to temperature. Often bitumen is too hard and brittle at low temperatures and too soft in hot weather conditions.

The incorporation of block copolymers having three and four or more arms into bitumen can significantly enhance the performance of the bitumen in road, runway, racetrack, and roofing applications, both by improving its life expectancy and by reducing maintenance requirements. Addition of such a block copolymer into bitumen introduces significantly superior properties to the modified bitumen. For example, such a modified bitumen can be much more elastic at both low and high temperatures.

While the advantages of using such block copolymers in bitumen are well known, the use of such block copolymers is not trouble free. For example, in the coupling process, the number of arms produced is not limited to three or four but can go on to include five or more. For purposes of the present invention, the terms "five or more" and "greater than or equal to five" are represented by the term 5+. When the number of arms to the block copolymer exceeds four, (or=5+) then the advantages of including the block copolymer in bitumen to improve its physical and performance properties can begin to be outweighed by resulting processing difficulties. For example, a five arm polymer produces a substantially greater increase in bitumen viscosity than a three arm polymer.

One object of the present invention is to provide a method for producing block copolymers having increased three and four arm contents and reduced five and higher arm contents. A further object is to provide a composition that can be used in processes such a bitumen modification to improve the physical properties of modified bitumen without causing significant processing difficulties.

SUMMARY OF THE INVENTION

In one aspect, the present invention is a radial styrenic block copolymer having a general formula: $(AB)_nX$, wherein: (i) A is a styrenic block, (ii) B is a dienic block, (iii) X is a residue of a diester coupling agent, (iv) n is the number styrenic block copolymer arms bonded to the residue of a diester coupling agent, (v) the molecular weight of the styrenic block copolymer arm (AB) is from about 2000 daltons to about 300,000 daltons, and (vi) the weight percentage of the polymer wherein n=5+ is less than about 8 percent.

In another aspect, the present invention is a method for preparing a radial styrenic block copolymer comprising: (a) contacting styrenic and dienic monomers with an anionic polymerization initiator which is an organo-substituted alkali metal compound in a suitable solvent to form a living polymer cement; (b) adding from about 0.01 to about 1.5 equivalents of a metal alkyl compound per equivalent of living polymer chain ends to the cement, during or after polymerization, wherein the alkyl groups of the metal alkyl compound are chosen so that they will not exchange with the living polymer chain ends and the metal alkyl compound is selected from the group consisting of aluminum, zinc and magnesium alkyls having from 1 to 20 carbon atoms per alkyl substituent; and (c) adding a diester coupling agent to the cement under reaction conditions sufficient to couple the living polymer.

In still another aspect, the present invention is a modified bitumen comprising an admixture of a radial styrenic block copolymer having a general formula: $(AB)nX$, wherein: (i) A is a styrenic block, (ii) B is a dienic block, (iii) X is a residue of a diester coupling agent, (iv) n is the number styrenic block copolymer arms bonded to the residue of a diester coupling agent, (v) the molecular weight of the styrenic block copolymer chain (AB) is from about 2000 daltons to about 300,000 daltons, and (vi) the weight percentage of the polymer wherein n=5+ is less than about 8 percent; and bitumen.

DETAILED DESCRIPTION OF THE PREFERRED EMBODIMENTS

The block copolymers of the present invention are radial, with a general formula $(AB)_nX$. In this general formula, A stands for a vinyl aromatic polymer block; B stands for a conjugated diene polymer block, optionally hydrogenated; X stands for the residue of a coupling agent; n is more than 1, preferably from 2 to 10, more preferably from 2 to 5, most preferably from 2 to 4.

The block copolymers of the present invention may have a tapered block structure. Each block should contain predominantly only one component, A or B. The presence of the other component than the predominant one should be less than 5 weight percent, more preferably less than 2 weight percent. Most preferably each block contains only one or essentially only one component, i.e. A or B.

The block copolymers of the present invention are prepared using solution anionic polymerization techniques. Using this process, the copolymers are prepared by contacting the monomer or monomers to be polymerized simultaneously or sequentially with an anionic polymerization initiator such as group IA metals, their alkyls, amides, silanolates, naphthalides, biphenyls or anthracenyl derivatives. It is preferred to use an organo alkali metal (such as lithium or sodium or potassium) compound in a suitable solvent at a temperature within the range from about −150° C. to about 150° C., preferably at a temperature within the range from about −70° C. to about 100° C. Particularly effective anionic polymerization initiators are organo lithium compounds having the general formula:

wherein R is an aliphatic, cycloaliphatic, aromatic or alkyl-substituted aromatic hydrocarbon radical having from 1 to about 20 carbon atoms and n is an integer of 1 to 4. The organolithium initiators are preferred for polymerization at higher temperatures because of their increased stability at elevated temperatures.

The polymerization of the method of the present invention is carried out, preferably at a temperature of 20° C. to 90° C. prior to addition of the metal alkyl, in a hydrocarbon solvent. Suitable solvents include straight and branched chain hydrocarbons such as pentane, hexane, octane and the like, as well as alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as dimethyl ether, methylethyl ether, diethyl ether, tetrahydrofuran and the like.

In the anionic polymerization process described above, there results an admixture of living polymer chains, solvent, byproducts, and the like, hereinafter referred to as the polymer cement. The present invention includes adding from about 0.01 to about 1.5 equivalents, more preferably, from about 0.9:1 to about 1.1:1 equivalents of a metal alkyl compound per equivalent of living polymer chain ends to the cement, during or after polymerization. It is also preferable to add the metal alkyl in the latter stages of the diene polymerization, as this is the point at which the polymer cement viscosity may become a significant issue. Preferably the metal alkyl is added after completion of 50% of the diene polymerization, more preferably after 70% and most preferably after 90% of the diene polymerization. Addition of a metal alkyl reduces the polymerization rate at a given temperature, but it also reduces the rate of thermal termination reactions quite significantly. As a consequence, it is preferable to conduct the remainder of the polymerization at a temperature of at least 90° C., preferably 100° C. to 120° C. In a preferred process, the temperature of the polymerization is allowed to increase to about 90° C.–100° C. just prior to the addition of the metal alkyl.

In the practice of the method of the present invention, it is preferred that the alkyl groups of the metal alkyl compound are chosen so that they will not exchange with the living polymer chain ends. To this end, the metal alkyl compound is selected from the group consisting of aluminum, zinc and magnesium alkyls having from 1 to 20 carbon atoms per alkyl substituent. Preferably, the metal alkyl is selected from the group consisting of trialkyl aluminum, dialkyl magnesium, and dialkyl zinc compounds. Preferred trialkylaluminum compounds are triethylaluminum, trimethylaluminum, tri-n-propylaluminum, tri-n-butylaluminum, triisobutylaluminum, tri-n-hexylaluminum, and trioctylaluminum. Triethylaluminum is most preferred. Preferred dialkylmagnesium compounds are butylethylmagnesium, di-n-butylmagnesium, and di-n-hexylmagnesium. Preferred dialkylzinc compounds are dimethylzinc, diethylzinc, di-n-propylzinc, diisobutylzinc, and di-n-butylzinc.

The use of these materials in the manufacture of block copolymers is the subject of U.S. Pat. No. 6,391,981 to Willis, et al. Therein, it is disclosed that use of such materials can significantly reduce the viscosity of polymer cements formed therewith. Such a reduction in viscosity in the polymer cements can offer advantages in manufacturing. The present invention relates to the certain improvements in the coupling efficiency and properties of coupled block copolymers prepared using these metal alkyl materials.

Coupling efficiency is of critical importance in the synthesis of block copolymers, which copolymers are prepared by a linking technology. In a typical anionic polymer synthesis, prior to the coupling reaction, the unlinked arm can have only one hard segment, typically polystyrene. Two hard segments are required in the block copolymer if it is to contribute to the strength mechanism of the material. Uncoupled arms can dilute the strength-forming network of a block copolymer that weakens the material itself.

The very high coupling efficiency realized in the present invention can be particularly important in applications such as preparing a modified bitumen. One advantage of coupled styrenic block polymer modified bitumen over unmodified bitumen is better high and low temperature performance, and this is believed to be due to the network forming properties of the coupled styrenic block polymers. The uncoupled block polymer oligomers that are present in the block polymers do not contribute, at least to the same extent per weight, as the coupled block polymer oligomers.

For purposes of the present invention, coupling efficiencies are calculated from a GPC curve using the formula: ((total measured area percents−uncoupled block area percents)/total measured area percents)×100. Coupling efficiencies, also referenced as C/E, can also be calculated using area percents: (((n=1+n=2 . . . n=5+) −(n=1))/(n=1, n=2 . . . n=5+))×100 and is expressed as percent. A block polymer having a C/E of 100 would have no n=1 present or detectable by GPC.

While not technically a measure of coupling efficiency as defined above, the polymers of the present invention have an improved property characterized as a low value relative to a conventional polymer for the sum of percentages of the n=2 and n=5+ oligomers. Even in the polymers of the present invention wherein the polymerization conditions were such that the coupling efficiency was at near conventional values, the sum of percentages of the n=2 and n=5+ oligomers is substantially lower than that for conventional polymers.

The block copolymers of the present invention preferably have three and four armed forms as the predominant oligomers and are prepared by coupling copolymer molecules, AB, together, wherein the copolymer molecules have been prepared using metal alkyls as described above. The coupling agent may be any di-ester. Preferably, the diester is selected from the group consisting of dimethyl adipate, diethyl adipate, dimethyl terephthalate, diethyl terephthalate, and mixtures thereof. To accelerate the coupling reaction, an accelerating agent or agents, may be employed. These agents are usually polar compounds and are essentially aprotic. Examples of these agents include aromatic ethers, linear alkyl ethers, and cycloalkyl ethers. Particularly preferred accelerating agents are ortho-dimethoxy-benzene, glyme, and diglyme. When employed, these accelerating agents are added in an amount within the range of from about 100 to 1,000 ppm based on the amount of the total solution. Amounts in the range of from about 200 to 500 ppm are preferred.

Suitable vinyl aromatic compounds useful with the process of the present invention include those having from 8 to 20 carbon atoms and include styrene, o-methylstyrene, p-methylstyrene, p-tert-butylstyrene, 2,4-dimethylstyrene, α-methylstyrene, vinylnaphthalene, vinyltoluene, vinylxylene, and mixtures thereof. Preferred monovinyl aromatic compounds are styrene, alpha-methylstyrene and para-methylstyrene, styrene being the most preferred. For the purposes of the present invention, a styrenic block copolymer is any block copolymer polymer prepared with a suitable vinyl aromatic compound.

Conjugated dienes suitable for use with the present invention include those having from 4 to 8 carbon atoms, for example 1,3-butadiene, 2-methyl-1,3-butadiene (isoprene), 2,3-dimethyl-1,3-butadiene, 1,3-pentadiene and 1,3-hexadiene. Mixture of such dienes may also be used. Preferred conjugated dienes are 1,3-butadiene and isoprene.

The total average molecular weight of each are of the coupled styrenic block copolymer of the present invention is preferably within the range of from about 2,000 to about 300,000 daltons. More preferably, the number average molecular weight is from about 3,000 to about 150,000 daltons, and most preferably, from about 30,000 to 100,000 daltons.

The number average molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of other (block) polymers is expressed as styrene equivalent molecular weight. The detector used is preferably an ultraviolet detector.

The block copolymers of the present invention are branched, with a general formula $(AB)_nX$. As already defined, n is the number of branches. The polymers of the present invention are different from conventional polymers in that the higher coupling efficiency of the method of the present invention produces polymers which have a lower level of oligomers wherein n=5 or greater (n=5+). Such polymers are highly desirable in applications wherein the polymer is used to modify bitumen. The polymers of the present invention can impart the same favorable improvement in bitumen properties with a substantially reduced increase in bitumen viscosity, thus improving the processing conditions of the bitumen.

The bituminous component present in the bituminous compositions according to the present invention may be naturally occurring bitumen or derived from a mineral oil. Also, petroleum pitches obtained by a cracking process and coal tar can be used as the bituminous component as well as blends of various bituminous materials. Examples of suitable components include distillation or "straight-run bitumens", precipitation bitumens, e.g. propane bitumens, blown bitumens, e.g. catalytically blown bitumen or "Multiphalte", and mixtures thereof. Other suitable bituminous components include mixtures of one or more of these bitumens with extenders (fluxes) such as petroleum extracts, e.g. aromatic extracts, distillates or residues, or with oils. Suitable bituminous components (either "straight-run bitumens" or "fluxed bitumens") are those having a penetration in the range of from 50 to 250 dmm at 25° C. Preferably, bitumens having a penetration in the range of from 60 to 170 dmm are used. Both compatible as well as incompatible bitumens may be used.

The polymers of the present invention, when used as a bitumen modifier, are present in the bituminous composition in an amount in the range of from about 1 to about percent by weight, more preferably of from about 2 to about 12 percent by weight, based on total bituminous composition. The bituminous composition may also, optionally, contain other ingredients such as may be required for the end-use envisaged. Of course, if advantageous, other polymer modifiers may also be included in addition to the polymers of the present invention in the bituminous compositions.

After preparation, the coupled styrenic block copolymers of the present invention can be hydrogenated. Such hydrogenation can be accomplished using any of the methods known in the prior art. The hydrogenation will preferably be a selective hydrogenation wherein aromatic unsaturation is not hydrogenated.

The polymers of the present invention may also, optionally, contain various additives, such as antioxidants, ultraviolet absorbers, light stabilizers or coloring agents. Preferably the amount of these additives present in the polymer composition is not more than 5 weight parts per 100 weight parts of block copolymer.

EXAMPLES

The following examples are provided to illustrate the present invention. The examples are not intended to limit the scope of the present invention and they should not be so interpreted. Amounts are in weight parts or weight percentages unless otherwise indicated.

Example 1

A diblock polymer anion, S—B—Li, is prepared as follows: 157 kg cyclohexane and 11.7 kg styrene are charged to a reactor. Impurities are removed by the addition of small increments of sec-butyllithium until color is detected, and the 451 milliliters of a sec-butyl lithium solution (8.8 weight percent BuLi, 0.56 mol) is added to initiate the polymerization of styrene. Following polymerization of the styrene, butadiene is added to the reactor. A total of 31.1 kg of butadiene is added, resulting in a solids content (weight percent polymer produced) of 21 percent. 415 Grams of 25 weight percent triethylaluminum (TEA) in cyclohexane is added following addition of about 92 percent of the butadiene. The observed molecular weight of the styrene block and the quantity of styrene charged are used to calculate the moles of living polymer. Based upon this value, about 1.0 moles of TEA are present per mole of living chains. The rate of butadiene addition is adjusted to allow the temperature to reach about 95° C. just prior to the TEA addition. The temperature is maintained at about 100° C.–110° C. for the remainder of the butadiene polymerization. Following completion of the butadiene polymerization, 25 grams of dimethyl adipate (DMA) are added (DMA:PLi about 0.26).

The polymerization is terminated with methanol about 30 minutes later. The product is analyzed using Gel Permeation Chromatography (GPC). Before coupling, the styrene block has a molecular weight of about 22,000 daltons and the butadiene block has a molecular weight of about 55,000 daltons. The areas of the peaks corresponding to the various species as determined using an UV detector are reported in Table 1 below. Coupling efficiencies is also reported. Since a UV detector is sensitive only to the styrene repeat units and weight fraction of styrene is the same in all of the coupled species, these areas essentially represent the molar fraction of each species. These values can be converted to weight percent using the molecular weight of each species. For the present examples, the weight fractions are essentially identical to the UV areas.

Example 2

The product of Example 2 is prepared substantially identically to Example 1, except that the TEA:Li ratio is decreased to 0.98.

Example 3

The product of Example 3 is prepared substantially identically to Example 1, except that the TEA is added following the polymerization of about 99.5 percent of the butadiene. The TEA:Li ratio is 0.99.

Example 4

The product of Example 4 is prepared substantially identically to Example 1, except that the TEA is added following the polymerization of about 72 percent of the butadiene and the TEA:Li ratio is increased to about 1.03.

Example 5

The product of Example 5 is prepared substantially identically to Example 1, except that the monomer charges are increased slightly, resulting in a solids level at the end of polymerization of 22 percent, the TEA is added following the polymerization of about 72 percent of the butadiene, and the TEA:Li ratio is decreased to about 0.96.

Comparative Example 6

The product of Comparative Example 6 is prepared substantially identically to Example 1, except that no TEA is added.

TABLE 1

| Example # | n = 1 | n = 2 | n = 3 | n = 4 | n = 5+ | C/E (%) |
|---|---|---|---|---|---|---|
| 1 | 10.2 | 6.1 | 22.8 | 55.4 | 5.3 | 89.8 |
| 2 | 6.6 | 4.4 | 23.9 | 62.6 | 2.6 | 93.4 |
| 3 | 5.2 | 4.8 | 21.5 | 63.9 | 4.6 | 94.8 |
| 4 | 18.3 | 7.5 | 25.9 | 44.5 | 3.8 | 81.7 |
| 5 | 16.6 | 8.5 | 33.7 | 37.8 | 3.4 | 83.4 |
| Comparative 6 | 15.5 | 8.6 | 14.8 | 49.8 | 12.1 | 84.6 |

Results are in area percents based on GPC values using a UV detector.

Example 7 a–d

A modified bitumen is prepared by admixing 12 percent by weight of a polymer of the present invention with a compatible bitumen, specifically a Venezuelan bitumen having an asphaltenes content of about 13 percent and the trade designation B-180. The admixture is further prepared by blending at about 180° C. for about 45 minutes using a SILVERSON L4R high shear mixer. The sample is tested for: Penetration at 25° C. using ASTM D-5; Ring and Ball Softening Point (° C.) using ASTM D-36; Viscosity at 180° C. (Pa·s) using ASTM D-4402; Cold Bend (° C.) using ASTM D-5147; and DIN Flow (° C.) using DIN 52123. The results are reported below in Table 2.

Comparative Example 8

The procedure of Example 7 is repeated substantially identically except a conventional block copolymer having the trade designation D 1184 available form KRATON POLYMERS LLC is used.

Example 9 a–d

The procedure of Example 7 is repeated substantially identically except the bitumen is an incompatible bitumen, prepared from a mix of propane bitumen and bright furfural extract in the ratio 67/33, and having a trade designation of PX-200.

Comparative Example 10

The procedure of Example 9 is repeated substantially identically except a conventional block copolymer having the trade designation D 1184 available form KRATON POLYMERS LLC is used.

TABLE 2

| Sample ID | 7a | 7b | 7c | 7d | Comparative 8 |
|---|---|---|---|---|---|
| n = 1 | 13.8% | 17.5% | 9.8% | 8.4% | 16.7% |
| n = 2 + n = 3 | 77.6% | 78.1% | 82.1% | 86.2% | |
| n = 5+ | 3.2% | 2.6% | 2.7% | 2.2% | 8.5 |
| n = 4 Peak Mol Wt. | 409 K | 445 K | 402 K | 401 K | 422 K |
| Coupling Efficiency | 85.5% | 82.7% | 89.6% | 91.4% | 82.7% |
| Bitumen | B-180 | B-180 | B-180 | B-180 | B-180 |
| Pen at 25° C., dmm | 56 | 51 | 54 | 45 | 46 |
| Softening point R & B, ° C. | 123 | 124 | 122 | 125 | 123 |
| Viscosity at 180° C., Pa · s | | | | | |
| Shearrate 20 s-1 | 2.5 | 2.6 | 2.8 | 2.1 | 2.3 |
| Shearrate 100 s-1 | 1.7 | 1.9 | 1.9 | 1.9 | 1.9 |
| Cold bend, pass ° C. | −20 | −25 | −35 | −35 | −25 |

TABLE 2-continued

| DIN Flow, pass ° C. | 100 | 100 | 105 | 100 | 95 |
|---|---|---|---|---|---|

| Sample ID | 9a | 9b | 9c | 9d | Comparative 10 |
|---|---|---|---|---|---|
| n = 1 | 13.8% | 16.9% | 9.8% | 5.3% | 16.7% |
| n = 2 + n = 3 | 77.6% | 80.7% | 82.1% | 87.7% | |
| n = 5+ | 3.2% | 1.3% | 2.7% | 4.2% | 8.5 |
| n = 4 Peak Mol Wt. | 409 K | 465 K | 402 K | 424 K | 422 K |
| Coupling Efficiency | 85.5% | 84.6% | 89.6% | 93.7% | 82.7% |
| Bitumen | PX-200 | PX-200 | PX-200 | PX-200 | PX-200 |
| Pen at 25° C., dmm | 62 | 66 | 55 | 40 | 51 |
| Softening point R & B, ° C. | 121 | 120 | 120 | 127 | 123 |
| Viscosity at 180° C., Pa · s | | | | | |
| Shearrate 20 s-1 | 2.6 | 3.6 | 3.1 | 3.4 | 3.5 |
| Shearrate 100 s-1 | 2.5 | 3.6 | 2.6 | 2.8 | 3.4 |
| Cold bend, pass ° C. | −30 | −25 | −35 | −25 | −25 |
| DIN Flow, pass ° C. | 95 | 95 | 100 | 95 | 95 |

What is claimed is:

1. A method for preparing a radial styrenic block copolymer having a general formulas:

$$(AB)_nX$$

wherein:
(i) A is a styrenic block,
(ii) B is a dienic block,
(iii) X is a residue of a diester coupling agent,
(iv) n is the number styrenic block copolymer arms bonded to the residue of a diester coupling agent,
(v) the molecular weight of the styreniec block copolymer arm (AB) is from about 2000 dalton to about 300,000 daltons, and
(vi) the weight percentage of the polymer wherein n is at least 5 is less than about 8 percent, comprising:
(a) contacting styrenic and dienic monomers with an anionic polymerization initiator which is an organo-substituted alkali metal compound in a suitable solvent to form a living polymer cement;
(b) adding from about 0.01 to about 1.5 equivalents of a metal alkyl compound per equivalent of living polymer chain ends to the cement, during or after polymerization, wherein the alkyl groups of the metal alkyl compound are chosen so that they will not exchange with the living polymer chain ends and the metal alkyl compound is selected from the group consisting of aluminum, zinc and magnesium alkyls having from 1 to 20 carbon atoms per alkyl substituent; and
(c) adding a diester coupling agent to the cement under reaction conditions sufficient to couple the living polymer; and wherein the weight percentage of the polymer so formed having n=5+ is less than about 8 percent.

2. The method of claim 1 wherein 0.9:1 to 1.1:1 equivalents of a metal alkyl compound per equivalent of living polymer chain ends is added to the cement.

3. The method of claim 1 wherein the metal alkyl compound is a trialkyl aluminum compound.

4. The method of claim 3 wherein the trialkyl aluminum compound is triethyl aluminum.

5. The method of claim 1 wherein the molar ratio of diester to living polymer chains is from about 0.2:1 to about 0.3:1.

6. The method of claim 1 wherein the molar ratio of diester to living polymer chains is about 0.25:1.

7. The method of claim 1 wherein the metal alkyl compound is added in step (b) at or after 70 weight percent conversion of the monomers.

8. The method of claim 7 wherein the metal alkyl compound is added in step (b) at or after 90 weight conversion of the monomers.

9. A radial styrenic block copolymer having a general formula:

$$(AB)_nX$$

wherein:
(i) A is a styrenic block,
(ii) B is a dienic block,
(iii) X is a residue of a diester coupling agent,
(iv) n is the number styrenic block copolymer arms bonded to the residue of a diester coupling agent,
(v) the molecular weight of the styrenic block copolymer arm (AB) is from about 2000 daltons to about 300,000 daltons, and
(vi) the weight percentage of the polymer wherein n=5+ is less than about 8 percent, and wherein said copolymer is produced byte method of claim 1.

10. The radial styrenic block copolymer of claim 9 wherein the weight percentage of the polymer wherein n=5+ is less than about 6 percent.

11. The radial styrenic block copolymer of claim 10 wherein the weight percentage of the polymer wherein n=5+ is less than about 5 percent.

12. The radial styrenic block copolymer of claim 9 wherein the weight percentage of the polymer wherein n=2 is less than about 5 percent.

13. The radial styrenic block copolymer of claim 12 wherein the weight percentage of the polymer wherein n=2 and n=5+ is less than about 12 percent.

14. The radial styrenic block copolymer of claim 9 wherein the styrenic block (A) is polystyrene.

15. The radial styrenic block copolymer of claim 9 wherein the dienic block (B) is selected from the group consisting of polybutadiene, polyisoprene and mixtures thereof.

16. The radial styrenic block copolymer of claim 9 wherein the molecular weight of the styrenic block copolymer arm (AB) is from about 3,000 daltons to about 150,000 daltons.

17. The radial styrenic block copolymer of claim 13 wherein the molecular weight of the styrenic block copolymer arm (AD) is from about 30,000 daltons to about 100,000 daltons.

18. The radial styrenic block copolymer of claim 9 wherein the residue of a diester coupling agent is a residue of a diester selected from the group consisting of dimethyl adipate, diethyl adipate, dimethyl terephthalate, diethyl terephthalate, and mixtures thereof.

19. A modified bitumen comprising an admixture of a radial styrenic block copolymer of claim 9 and bitumen.

20. A hydrogenated radial styrenic block copolymer prepared by hydrogenating a radial styrenic block copolymer of claim 9.

21. The hydrogenated radial styrenic block copolymer of claim 20, wherein the radial styrenic block copolymer of claim 9 is hydrogenated using a selective hydrogenation process.

* * * * *